United States Patent
Cao

(10) Patent No.: US 9,294,894 B2
(45) Date of Patent: Mar. 22, 2016

(54) CALL REMINDER SYSTEM

(71) Applicants: MiTAC International Corp., Kuei San Township (TW); MiTAC Research (Shanghai) Ltd., Shanghai (CN)

(72) Inventor: Simon Cao, Shanghai (CN)

(73) Assignees: MiTAC International Corp., Kuei San Township (TW); MiTAC Research (Shanghai) Ltd., Shanghai (CN)

( * ) Notice: Subject to any disclaimer, the term of this patent is extended or adjusted under 35 U.S.C. 154(b) by 146 days.

(21) Appl. No.: 14/206,968

(22) Filed: Mar. 12, 2014

(65) Prior Publication Data
US 2014/0342706 A1 Nov. 20, 2014

(30) Foreign Application Priority Data
May 17, 2013 (CN) .......................... 2013 1 0185725

(51) Int. Cl.
*H04M 1/725* (2006.01)
*H04W 4/16* (2009.01)
*H04W 4/12* (2009.01)
*H04W 4/02* (2009.01)
*H04W 4/00* (2009.01)
*H04W 4/14* (2009.01)
*H04M 3/42* (2006.01)
*H04M 19/04* (2006.01)

(52) U.S. Cl.
CPC *H04W 4/16* (2013.01); *H04W 4/02* (2013.01); *H04W 4/12* (2013.01); *H04M 1/72566* (2013.01); *H04M 1/72569* (2013.01); *H04M 3/42042* (2013.01); *H04M 19/04* (2013.01); *H04W 4/008* (2013.01); *H04W 4/14* (2013.01)

(58) Field of Classification Search
CPC ........... H04W 4/16; H04W 4/12; H04W 4/02; H04W 4/008; H04W 4/14; H04W 4/023; H04W 4/22; H04W 88/02; H04W 4/20; H04M 1/72566; H04M 1/72569; H04M 2203/2072; H04M 1/575; H04M 3/42042; H04M 19/04; G06Q 10/06311; G06Q 10/109; G06Q 50/22; G06Q 10/1095; G06Q 10/10; G06Q 30/02; G06Q 50/24; G06Q 10/00; G06Q 30/0201; G06Q 30/0267; G06Q 10/06; G06Q 10/063114; G06Q 20/3278; G06Q 30/0222; G06F 19/327
USPC ........ 455/414.1, 466, 415, 412.2, 404.1, 418, 455/419, 445, 458, 567; 379/210.01, 379/207.02, 88.22, 67.1, 201.01, 215.01, 379/88.23
See application file for complete search history.

(56) References Cited

U.S. PATENT DOCUMENTS

| 2010/0086112 A1* | 4/2010 | Jiang | H04M 3/42042 379/93.23 |
| 2011/0076989 A1* | 3/2011 | Lynch | H04M 1/72566 455/412.1 |
| 2013/0110940 A1* | 5/2013 | Pasquero | H04M 1/72552 709/206 |

*Primary Examiner* — Fred Casca
(74) *Attorney, Agent, or Firm* — Wang Law Firm, Inc.

(57) ABSTRACT

A call reminder system includes a transmitting module and a processing module. The transmitting module receives an outside signal to generate a call signal. The processing module is connected to the transmitting module to receive the call signal and generate a call message corresponding to the call signal. When an executed signal is not received by the processing module in a first predetermined time, and the call message is in compliance with a reminder condition determined by the processing module, the processing module will generate a first reminder signal and deliver the first reminder signal to an external electronic device by the transmitting module. Thereby, the function of reminding the user of unanswered calls may be achieved.

8 Claims, 5 Drawing Sheets

CALL REMINDER SYSTEM

CROSS-REFERENCE TO RELATED APPLICATION

This application claims the benefit of China Patent Application No. 201310185725.8, filed on May 17, 2013, in the State Intellectual Property Office of the People's Republic of China, the disclosure of which is incorporated herein in its entirety by reference.

BACKGROUND OF THE INVENTION

1. Field of the Invention

The present invention relates to a call reminder system, and more particularly to the call reminder system capable of reminding users about an unanswered call by an external electronic device.

2. Description of the Related Art

As our society advances, mobile phones have been developed and merged into our daily life and become an indispensable tool, particularly for communications between people. Mobile phones play an important role in our life. For salespersons, communications with clients and manufacturers rely on the use of mobile phones substantially. Therefore, a call may involve an important message or may relate to an important client. If a call is not picked up immediately, or messages saved in the mobile phone are not retrieved immediately, it may cause losses to the salespersons or their companies. For lovers or husbands and wives, an unanswered call may cause misunderstanding or even arguments, whenever a call is not answered or an unanswered call is not discovered.

In view of the aforementioned problems, many users set their mobile phone to a normal mode. However, people may set their mobile phone aside for some reasons in certain occasions such as talking to a client, having a meeting or attending a lecture. People may also set their mobile phone to a mute mode to prevent causing unnecessary disturbance or interference. However, users are busy and often forget to reset the mute mode back to the normal mode after a period of time. As a result, unanswered calls are not discovered, or important messages are missed.

SUMMARY OF THE INVENTION

In view of the aforementioned problems of the prior art, it is a primary objective of the present invention to provide a call reminder system to overcome the problems of failing to discover unanswered calls or missing important messages.

To achieve the aforementioned objective, the present invention provides a call reminder system, comprising a transmitting module and a processing module. The transmitting module receives an outside signal to generate a call signal. The processing module is connected to the transmitting module for receiving the call signal to generate a call message, generating a first reminder signal corresponding to the call signal when an execute signal is not received by the processing module at a first predetermined time, and delivering the first reminder signal to an external electronic device by the transmitting module when the call message is in compliance with a reminder condition determined by the processing module.

Wherein, when the first reminder signal is delivered to the external electronic device by the transmitting module and the execute signal is not received by the processing module in a second predetermined time, the processing module generates a second reminder signal and delivers the second reminder signal to the external electronic device by the transmitting module.

Wherein, the processing module continues generating the second reminder signal at each interval of a third predetermined time that the execute signal is not received Wherein, the processing module further generates a change signal synchronously while generating the second reminder signal, and controls the transmitting module to change from one transmission method to another transmission method.

Wherein, the transmission method is preferably a Bluetooth, Global System of Mobile Communications (GSM), Wireless-Fidelity (WiFi), 3rd-Generation (3G) transmission method or any combination of the above.

Wherein, the processing module calculates a frequency of generating the second reminder signal, and stops generating the second reminder signal when the frequency of generation exceeds a number of reminders.

Wherein, the external electronic device controls a display module to display the first reminder signal or the second reminder signal according to the first reminder signal or the second reminder signal and perform a reminding action, when the first reminder signal or the second reminder signal is received by the external electronic device.

Wherein, the external electronic device displays the first reminder signal or the second reminder signal on the display module by an instant messaging program or an email program.

Wherein, the processing module controls the transmitting module to send the first reminder signal or the second reminder signal by means of a short message service (SMS) to the external electronic device according to predetermined communication data.

Wherein, the call reminder system further comprises a memory module connected to the processing module and provided for storing a plurality of communication data, wherein the reminder condition is one of the communication data in compliance with the call message.

Wherein, the reminder condition refers to the cumulative number of the same call messages reaching a predetermined number of calls when the execute signal is not received by the processing module at the first predetermined time.

In summation, the call reminder system of the present invention has one or more of the following advantages:

(1) The call reminder system of the invention can remind a user or any other person by an external electronic device via an instant messaging program or an email program according to a non-executed call message, so that the user can know about the non-executed call message.

(2) The call reminder system of the invention can remind a user or any other person by an external electronic device via a short message service (SMS) according to a non-executed call message, so that the user can know about the non-executed call message, and the call reminder system can overcome the problem of missing a call or a message.

(3) The call reminder system of the invention can remind a user or any other person by an external electronic device via the latest activity or message service of a social network website according to a non-executed call message, so that the user can know about the non-executed call message, (4) The call reminder system of the invention can remind a user by a global positioning system (GPS) about a non-executed call message and overcome the problems of missing a call or a message and forgetting the position where the mobile phone is put.

DESCRIPTION OF THE PREFERRED EMBODIMENTS

The technical characteristics, contents, advantages and effects of the present invention will be apparent with the detailed description of a preferred embodiment accompanied with related drawings as follows. It is noteworthy that same numerals are used to represent respective elements in the following preferred embodiments.

Figure 1:
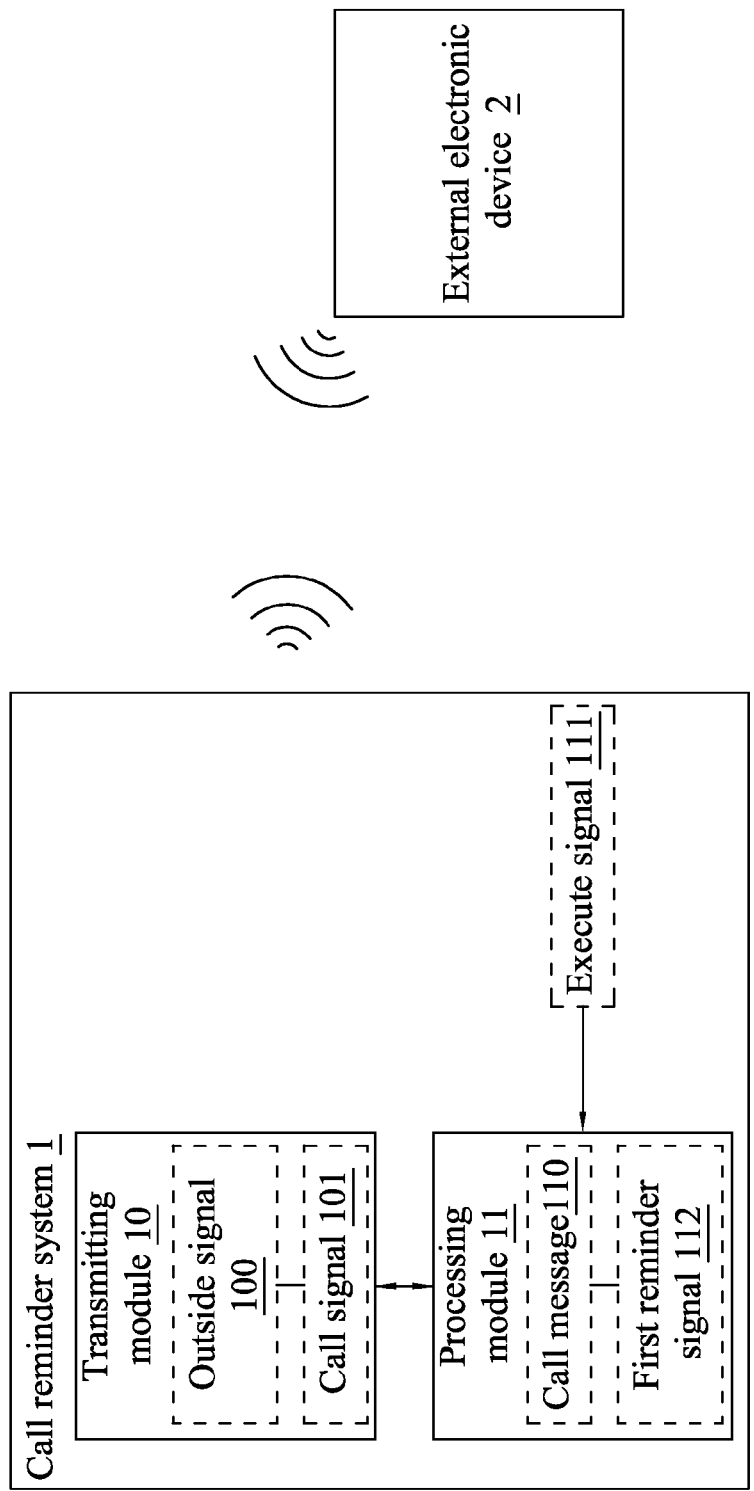
FIG. 1 is a first schematic view of a call reminder system in accordance with a first preferred embodiment of the present invention.
Figure 2:
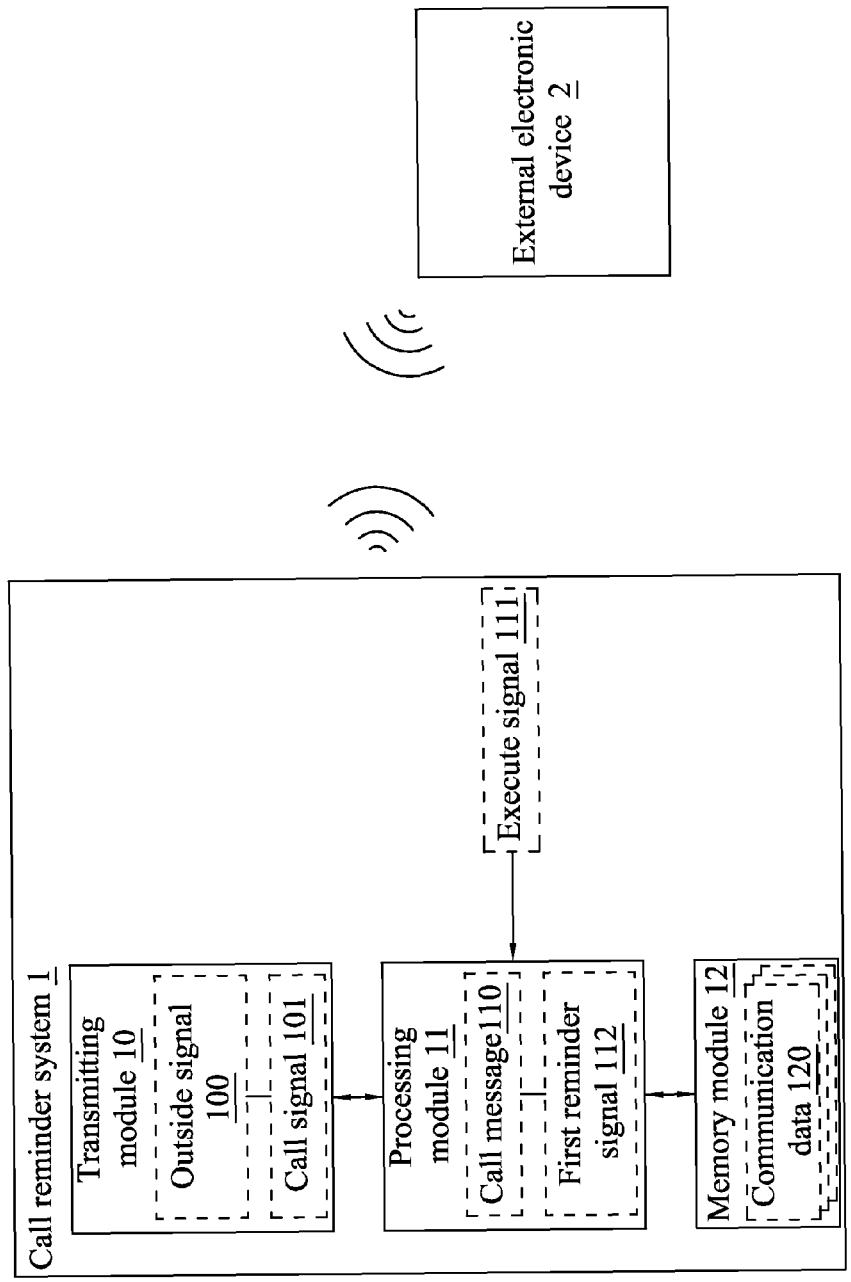
FIG. 2 is a second schematic view of a call reminder system in accordance with the first preferred embodiment of the present invention.

With reference to FIGS. 1 and 2 for the first and second schematic views of a call reminder system in accordance with the first preferred embodiment of the present invention respectively, the call reminder system 1 is applied to an electronic mobile communication device. The call reminder system 1 comprises a transmitting module 10 and a processing module 11. The transmitting module 10 receives an outside signal 100 to generate a call signal 101. The processing module 11 is connected to the transmitting module 10 for receiving the call signal 101 and generating a call message 110 according to the call signal 101. When an execute signal 111 is not received by the processing module 11 at a first predetermined time and the processing module 11 determines that the call message 110 is in compliance with a reminder condition, the processing module 11 generates a first reminder signal 112 and delivers the first reminder signal 112 to an external electronic device 2 by the transmitting module 10.

For example, if the user wants to talk to a client, the ringtone of the electronic mobile communication device may be set to a mute mode in order to prevent disturbing the conversion with the client. Now, if a person other than the user wants to contact the user by making a call or sending a short message, and an outside signal 100 is sent to the electronic mobile communication device, then the transmitting module 10 of the call reminder system 1 will receive the outside signal 100, and then will convert the outside signal 100 into the call message 110 which can be a telephone number or a short message.

Since the user has set the electronic mobile communication device to the mute mode, therefore the user does not know that the call reminder system 1 has an unanswered call or will not read such call message 110. Therefore, if an execute signal 111 for reading or replying the call message 110 is not received by the processing module 11 at a first predetermined time, then the processing module 11 will determine whether the call message 110 is incompliance with a reminder condition. It is noteworthy that the starting time of the first predetermined time can be the time when the outside signal 100 arrives at the electronic mobile communication device or can be the time when the transmission of the outside signal 100 to the electronic mobile communication device is stopped. If the processing module 11 determines that the call message 110 is not in compliance with the reminder condition, then the processing module 11 will not perform the reminding action. If the processing module 11 determines that the call message 110 is in compliance with the reminder condition, the processing module 11 will generate a first reminder signal 112 and will deliver the first reminder signal 112 to the transmitting module 10 by a transmission method, and the first reminder signal 112 will be transmitted to the external electronic device 2. Wherein, the transmission method is preferably a Bluetooth, Global System of Mobile Communications (GSM), Wireless-Fidelity (WiFi), 3rd-Generation (3G) transmission method or any combination of the above. In this preferred embodiment, the Bluetooth transmission method is used for illustrating the invention. After the transmitting module 10 sends the first reminder signal 112 to the preset external electronic device 2 (such as a Smartphone), and this electronic device 2 can be a colleague's mobile phone or a friend's mobile phone.

Now, if any other person knows from the external electronic device 2 that the user's electronic mobile communication device has a non-executed call message, this person can tell the user, so that the user return a call. Such arrangement allows the user to know that there is a non-executed call message 110 and overcomes the problem of missing the call message 110.

In this preferred embodiment, the call reminder system 1 of the present invention further comprises a memory module 12 connected to the processing module 11 for storing a plurality of communication data 120. Each of the communication data 120 can be a telephone number or an email address related to the way of contacting a person in the directory during emergency. The communication data 120 can be a telephone number or an email address related to the way of contacting a service organization such as a hospital, a police station or a fire department. If a relative, friend or colleague of the user is situated at the aforementioned service organization, and the service organization sends an outside signal 100 to the call reminder system 1, the call reminder system 1 will be able to notice the user about the non-executed call message 110 through the aforementioned reminding actions and let the user now that a relative, friend or colleague may be situated at the service organization.

In the present invention, the reminder condition can refer to a call message 110 in compliance with one of the communication data 120. The reminder condition can refer to the cumulative number of calls of the same call message 110 reaching a predetermined number of calls when an execute signal 111 is not received by the processing module at a first predetermined time. Wherein, the predetermined number of calls can be set by user depending on situations, and this number can be 2, 3 or 4.

Figure 3:
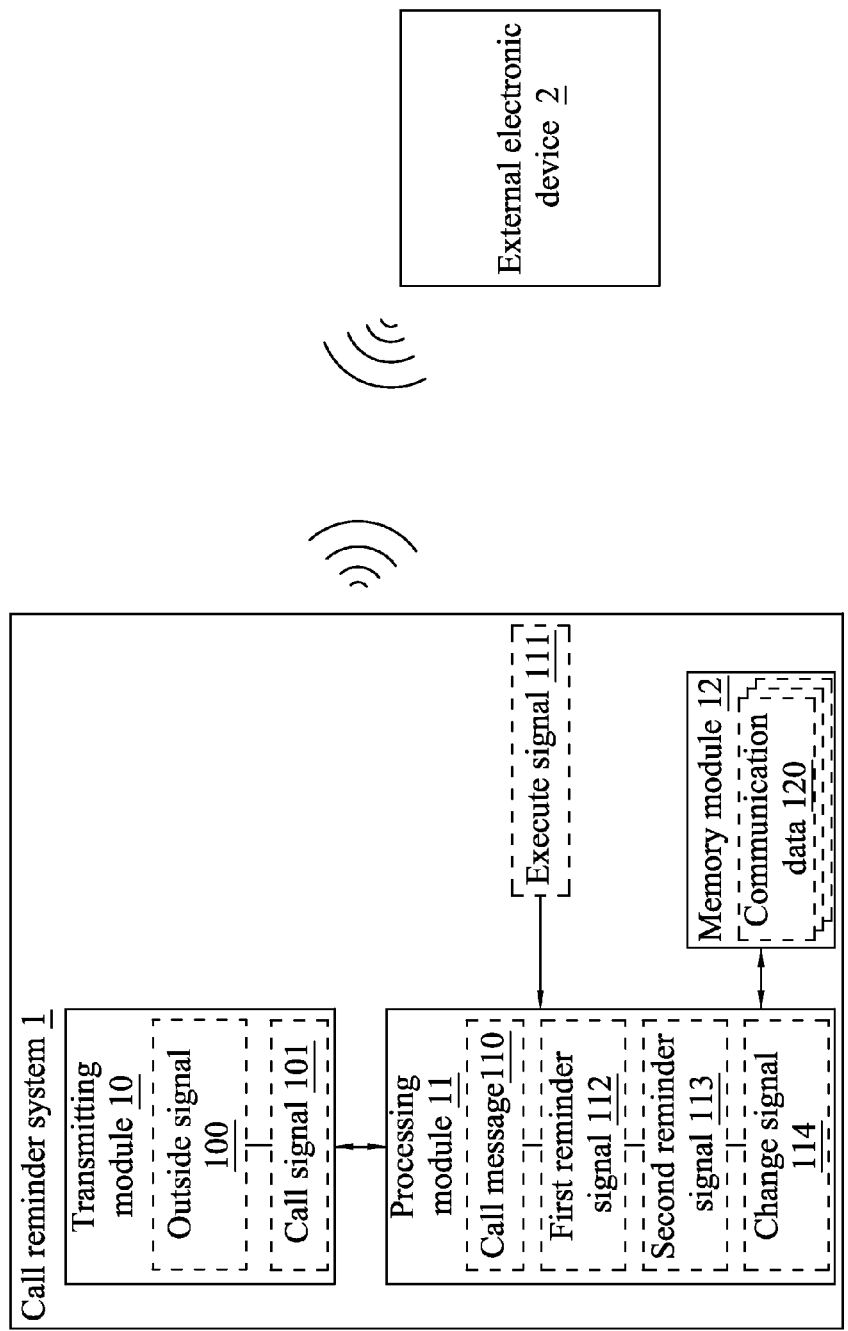
FIG. 3 is a schematic view of a call reminder system in accordance with a second preferred embodiment of the present invention.

With reference to FIG. 3 for a schematic view of a call reminder system in accordance with the second preferred embodiment of the present invention and FIGS. 1 and 2, the components of the call reminder system of this preferred embodiment are similar to those of the first preferred embodiment, and thus will not be repeated. However, it is noteworthy that the processing module 11 will generate a second reminder signal 113 in this preferred embodiment and send the second reminder signal 113 to an external electronic device 2 by the transmitting module 10 if the transmitting module 10 sends the first reminder signal 112 to the external electronic device 2, and an execute signal 111 is not received by the processing module 11 at a second predetermined time.

Wherein, the processing module 11 continues generating the second reminder signal 113 once for every interval of a third predetermined time of not receiving the execute signal 111. When the processing module 11 generates the second reminder signal 113, the processing module 11 synchronously generates a change signal 114 and controls the transmitting module 10 to change the transmission method to another transmission method according to the change signal 114. In addition, the processing module 11 calculates the frequency of generating the second reminder signal 113 and will stop generating the second reminder signal when the frequency of generation exceeds the number of reminders. If the frequency of generation does not exceed the number of reminders, the processing module 11 will continue generating second reminder signal 113 repeatedly.

More specifically, after the call reminder system 1 sends the first reminder signal 112 to the external electronic device 2 by the transmitting module 10, the processing module 11 determines the following action taken according to the condition whether the execute signal 111 is received at a second predetermined time. If the external electronic device 2 cannot let the user or any other person know about the non-executed call message, the call reminder system 1 cannot receive the execute signal 111. Now, the execute signal 111 is not received by the processing module 11 at the second predetermined time, so that the processing module generates a second reminder signal 113 as a second reminder, and the transmitting module 10 sends the second reminder signal 113 to the external electronic device 2.

The processing module 11 continues determining whether the execute signal 111 is received at the third predetermined time in order to determine the action taken thereafter. If the processing module 11 receives the execute signal 111, the reminding function will be disabled. If the execute signal 111 is not received by the processing module 11 at the third predetermined time, the processing module 11 will continue generating the second reminder signal once for every third predetermined time, and the transmitting module 10 sends the second reminder signal 113 to the external electronic device 2 to perform the reminding action. In the meantime, the processing module 11 generates a change signal in the period of the third predetermined time to control the transmission method of the transmitting module. For example, the Bluetooth transmission method is changed to the Wireless-Fidelity (WiFi) 3rd-Generation (3G) transmission method or a combination of the above. Different transmission methods are sent to each external electronic device, and different reminding methods are used to remind the user to achieve a reminding effect without any blind spots.

It is noteworthy that the processing module 11 also generates a change signal while generating the second reminder signal, so that the transmission method of the first reminder signal is different from the transmission method of the second reminder signal.

Figure 4:
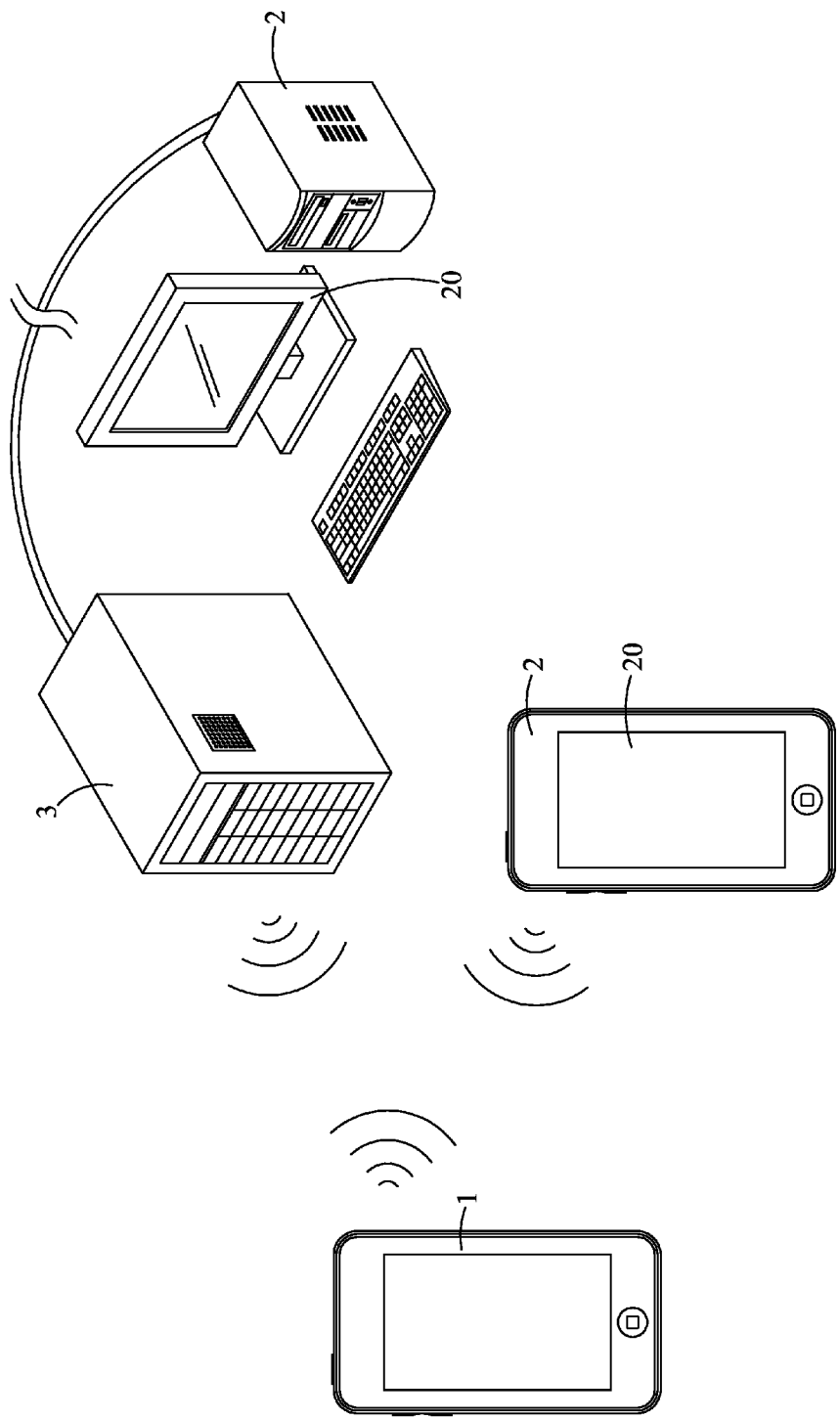
FIG. 4 is a schematic view of a reminder given by an external electronic device of a call reminder system of the present invention.

With reference to FIG. 4 for a schematic view of a reminder made by an external electronic device of a call reminder system of the present invention and FIGS. 1 to 3, the components of the call reminder system of this preferred embodiment are similar to those of the first preferred embodiment, and thus will not be repeated. However, it is noteworthy that the external electronic device 2 of this preferred embodiment is a computer, a mobile phone, a personal digital assistant (PDA) or an automobile global positioning system (GPS). When the first reminder signal 112 or the second reminder signal 113 is received, the external electronic device 2 controls a display module 20 to display the first reminder signal 112 or the second reminder signal 113 according to the first reminder signal 112 or the second reminder signal 113, and further performs the reminding action. Wherein, the external electronic device 2 displays the first reminder signal 112 or the second reminder signal 113 at the display module 20 by an instant messaging program or an email program.

Further, when the call reminder system 1 sends the first reminder signal 112 or the second reminder signal 113 to the external electronic device 2 (such as the user's computer) by the transmitting module 10, an instant messaging program or an email program is used to display the first reminder signal 112 or the second reminder signal 113 at the display module 20 (such as a screen) of the external electronic device 2 after the external electronic device 2 receives the first reminder signal 112 or the second reminder signal 113, so as to allow the user or any other person to know about the non-executed call message.

Wherein, the call reminder system 1 can also send the first reminder signal 112 or the second reminder signal 113 to the external electronic device 2 through a server 3 by a latest activity or a message service of a social network website, and the display module 20 displays the first reminder signal 112 or the second reminder signal 113 to let the user or any other person know about the non-executed call message.

In addition, the call reminder system 1 can also send the first reminder signal 112 or the second reminder signal 113 to a global positioning system (GPS) of the user or any other person through the transmitting module 10 to let the user or any other person know about the non-executed call message, or know about the position where the user's call reminder system 1 is currently located.

In addition, the processing module 11 of the call reminder system 1 can control the transmitting module 10 according to predetermined communication data such as a telephone number or an email address for personal contact, and a short message service (SMS) is used to send the first reminder signal 112 or the second reminder signal 113 to the external electronic device 2 (such as a friend's mobile phone or a colleague's mobile phone), so that the user or any other person can know that the user has a non-executed call message.

In short, a short message can be sent to a predetermined phone for the first reminder, and the message is sent to an instant messaging program or an email program as the second reminder in order to achieve the reminding effect without any blind spot.

It is noteworthy that the user can save a predetermined voice message in a memory module 12, so that when the call reminder system 1 performs a reminding action, a house phone can be dialed to play the predetermined voice message to remind the user. When the call reminder system 1 performs the reminding action, the delivery of the reminder is not limited to an electronic mobile communication device such as a mobile phone only.

Figure 5:
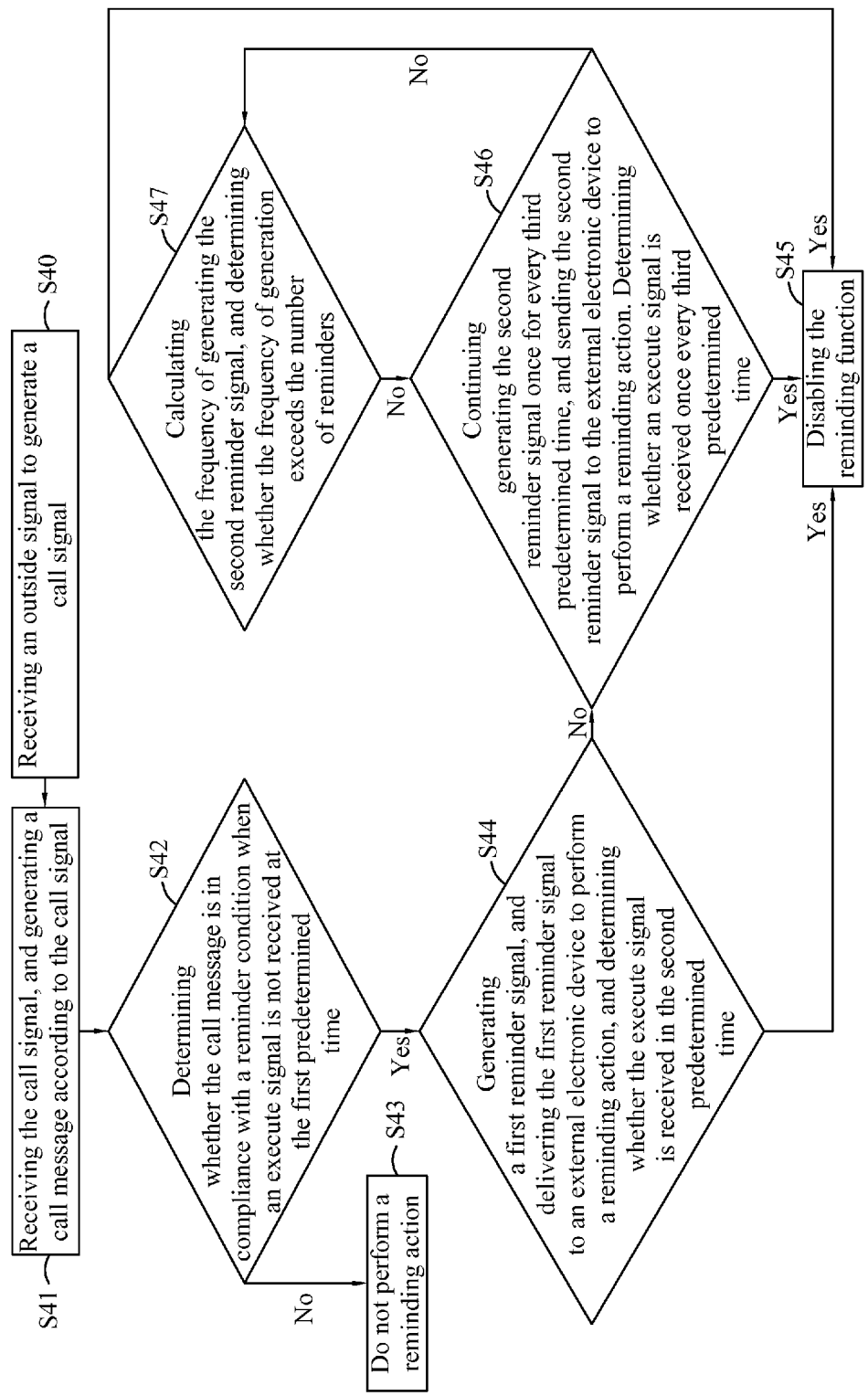
FIG. 5 is a flow chart of a reminding method of a call reminder system in accordance with the present invention.

With reference to FIG. 5 for a flow chart of a reminding method of a call reminder system in accordance with the present invention as well as FIGS. 1 to 4, the reminding method of the present invention comprises the following steps:

S40: Receiving an outside signal to generate a call signal.

S41: Receiving the call signal, and generating a call message according to the call signal.

S42: Determining whether the call message is in compliance with a reminder condition when an execute signal is not received at the first predetermined time. If yes, then go to the step S43, or else go to the step S44.

S43: Do not perform a reminding action.

S44: Generating a first reminder signal, and delivering the first reminder signal to an external electronic device to perform a reminding action, and determining whether the execute signal is received at the second predetermined time. If yes, then go to the step S45, or else go to the step S46.

S45: Disabling the reminding action.

S46: Continuing generating the second reminder signal once for every third predetermined time, and send the second reminder signal to the external electronic device to perform a reminding action. Determining whether an execute signal is received once every third predetermined time. If yes, then go to the step S45, or else go to the step S47.

S47: Calculating the frequency of generating the second reminder signal, and determining whether the frequency of generation exceeds the number of reminders. If yes, then go to the step S45, or else go to the step S46.

In the step S46, the processing module can synchronously generate a change signal while generating the second reminder signal and control the transmitting module according to the change signal to change one of the transmission methods to another transmission method. For example, the Bluetooth transmission method is changed to the Wireless-Fidelity (WiFi), 3-rd Generation (3G) transmission method, or a combination of the above.

While embodiments of the present invention have been described in connection with certain exemplary embodiments, the purpose is to convey the scope of the present invention to those of skill in the art for practice, and it is to be understood that the invention is not limited to the disclosed embodiments, but, on the contrary, is intended to cover various modifications and equivalent arrangements included within the spirit and scope of the appended claims, and equivalents thereof.

What is claimed is:

1. A call reminder system for reminding users about an unanswered call by using a plurality of external electronic devices, comprising:
    a transceiver including a first terminal, the transceiver receiving an outside signal to generate a call signal; and
    a processor including a second terminal connected to the first terminal of the transmitting module, the processor receiving the call signal via the second terminal to generate a call message, generating a first reminder signal when an execute signal is not received by the processor at a first predetermined time and the call message is in compliance with a reminder condition determined by the processor, and delivering the first reminder signal to one external electronic device of the plurality of external electronic devices by the transceiver via the second terminal and the first terminal,
    wherein when the first reminder signal is delivered to the one external electronic device by the transceiver and the execute signal is not received by the processor in a second predetermined time, the processor generates a second reminder signal and delivers the second reminder signal to the one external electronic device by the transceiver via the second terminal and the first terminal, at each interval of a third predetermined time that the execute signal is not received, the processor continues to generate the second reminder signal, wherein the processor further generates a change signal synchronously while generating the second reminder signal, and controls the transceiver to change from one transmission method to another transmission method for delivering the second reminder signal to another external electronic device of the plurality of external electronic devices.

2. The call reminder system of claim 1, wherein the transmission method is a Bluetooth, Global System of Mobile Communications (GSM), Wireless-Fidelity (WiFi), 3rd-Generation (3G) transmission method or a combination thereof.

3. The call reminder system of claim 1, wherein the processor calculates a frequency of generating the second reminder signal, and stops generating the second reminder signal when the frequency of generation exceeds a number of reminders.

4. The call reminder system of claim 1, wherein the external electronic device controls a display module to display the first reminder signal or the second reminder signal according to the first reminder signal or the second reminder signal and perform a reminding action, when the first reminder signal or the second reminder signal is received by the external electronic device.

5. The call reminder system of claim 4, wherein the external electronic device displays the first reminder signal or the second reminder signal on the display module by an instant messaging program or an email program.

6. The call reminder system of claim 4, wherein the processor controls the transceiver to send the first reminder signal or the second reminder signal by means of a short message service to the external electronic device according to predetermined communication data.

7. The call reminder system of claim 1, further comprising a memory module connected to the processing module and provided for storing a plurality of communication data, wherein the reminder condition is one of the communication data in compliance with the call message.

8. The call reminder system of claim 7, wherein the reminder condition refers to the cumulative number of the same call messages reaching a predetermined number of calls when the execute signal is not received by the processor in the first predetermined time.

* * * * *